(12) United States Patent
Rance et al.

(10) Patent No.: US 7,238,270 B2
(45) Date of Patent: Jul. 3, 2007

(54) PROCESS FOR THE DISSOLUTION OF ACTINIC OXIDES

(75) Inventors: Peter Jonathan Watson Rance, St. Bees (GB); Robert John Bernard, Cockermouth (GB)

(73) Assignee: British Nuclear Fuels PLC (GB)

( * ) Notice: Subject to any disclaimer, the term of this patent is extended or adjusted under 35 U.S.C. 154(b) by 0 days.

(21) Appl. No.: 10/528,905

(22) PCT Filed: Sep. 26, 2003

(86) PCT No.: PCT/GB03/04097

§ 371 (c)(1),
(2), (4) Date: Nov. 14, 2005

(87) PCT Pub. No.: WO2004/029989

PCT Pub. Date: Apr. 8, 2004

(65) Prior Publication Data

US 2006/0110303 A1    May 25, 2006

(30) Foreign Application Priority Data

Sep. 27, 2002  (GB) ................................ 0222475.6

(51) Int. Cl.
*C01G 56/00* (2006.01)
(52) U.S. Cl. .............................. 205/44; 205/46; 205/49
(58) Field of Classification Search ................... 205/43, 205/44, 46, 49
See application file for complete search history.

(56) References Cited

U.S. PATENT DOCUMENTS 3,932,225 A * 1/1976 Bilal et al. .................... 205/44
4,749,519 A 6/1988 Koehly et al.
5,069,827 A 12/1991 Machuron-Mandard et al.
5,171,546 A 12/1992 Guy et al.
5,174,546 A 12/1992 Giordani
5,437,847 A 8/1995 Yoneya et al.
5,745,835 A 4/1998 Mouliney et al.

OTHER PUBLICATIONS

M. M. Vlasov, et al.; Laser Stimulated extraction of palladium from solutions; Physics-Doklady, vol. 38, No. 9, pp. 394-395; Sep. 1, 1993; American Institute of Physics, New York, US.
Y.-Z. Wei, et al.; Separation of Actinides from Simulated Spent Fuel Solutions by an Advanced Ion-Exchange Process; Journal of Alloys and Comounds; vol. 271-273, pp. 693-696; Jun. 12, 1998; Elsevier Sequoia, Lausanne, CH.

* cited by examiner

*Primary Examiner*—Arun S. Phasge
(74) *Attorney, Agent, or Firm*—Marianne Fuierer; Moore & Van Allen PLLC

(57) ABSTRACT

The invention provides a process for dissolving actinic oxides, the process comprising performing the steps of (a) introducing the actinic oxides into a solution of nitric acid; (b) treating the acidic solution in order to substantially remove palladium; and (c) treating with divalent silver. Preferably, the actinic oxides are comprised in spent nuclear fuel. Optionally, the process comprises a second treatment of the acidic solution in order to substantially remove palladium and a second treatment with divalent silver. The steps may be performed on a batchwise or continuous basis. The treatment to remove palladium is preferably carried out by solvent extraction or ion exchange, and provides greatly improved rates of dissolution of oxides of plutonium. The treatment with divalent silver preferably involves the addition of a source of monovalent silver, followed by an electrolysis treatment to generate divalent silver.

22 Claims, No Drawings

PROCESS FOR THE DISSOLUTION OF ACTINIC OXIDES

This application claims priority to International Patent Application No. PCT/GB2003/004097 filed Sep. 26, 2003, which claims priority to Great Britain Patent Application No. 0222475.6 filed Sep. 27, 2002 in the European Patent Office. The entire disclosures of each of these patent applications are incorporated herein by reference.

The present invention relates to a process for the dissolution of oxides of plutonium and materials containing these oxides. More specifically, it is concerned with a process for the treatment of materials comprising mixtures of plutonium dioxide ($PuO_2$) with uranium dioxide ($UO_2$), and/or mixed uranium and plutonium oxides (($U, Pu)O_2$), the latter being known as "MOx".

The dissolution of oxides of uranium and plutonium is a constant requirement in the nuclear industry where, for example, the recovery of residues resulting from fuel reprocessing necessitates the use of such techniques on a regular basis. Consequently, there are several well-established methods used for the dissolution of these materials. Thus, it is well known that $UO_2$ dissolves relatively easily in a solution of nitric acid, whilst the dissolution of $PuO_2$ requires the use of more sophisticated means, the most effective of which involves the use of divalent silver in solution.

A particularly effective technique for dissolving $PuO_2$ is an electrolytic dissolution procedure wherein the divalent silver functions as, an oxidation intermediate. The method is disclosed in FR-A-2562314, and involves introducing the oxide into a nitric acid solution containing silver nitrate, then passing the mixture through the anode component of an electrolyser. During the process of electrolysis, divalent silver is generated close to the anode and this causes oxidation of the plutonium of the $PuO_2$ to occur, the oxidised plutonium then dissolving in the nitric acid. When dissolution is complete, the solution containing dissolved uranium and plutonium is extracted.

Such a process, though, generally highly effective, may only be operated discontinuously, so that the treatment capacity is relatively limited. Furthermore, the electrolysis process is associated with a high consumption of electricity, with the consequence that the overall process is less than attractive in financial and commercial terms.

An attempt to improve the commercial viability of this method is proposed in EP-B-767465, which describes a process designed to deliver much lower operating costs by significantly reducing consumption of both silver and electricity. The technique involves a first step wherein oxides which are soluble therein—principally $UO_2$—are dissolved in nitric acid by addition of the oxide mixture to a circulating solution of the acid, whilst the solution is continuously extracted at a set rate through a filter. During this first step, addition of oxide and acid is carried out on a continuous basis, and it is intended that all the $UO_2$ should be dissolved. The method then provides a second step wherein the insoluble residue—principally comprising $PuO_2$—which has been collected in the filter is dissolved in nitric acid using divalent silver, generated in situ by electrolysis from monovalent silver which is only introduced into the system at the beginning of the second step; likewise, electrolysis only commences after the conclusion of the first step, by which time addition of oxide and acid has ceased.

The method proposed by EP-B-767465 is, therefore, commercially more attractive than the process disclosed in the earlier French patent specification, and the modified technique enables significant cost savings to be achieved. However, the present inventors have found that the rates of dissolution of $PuO_2$ achieved by these prior art methods are much less than would be desired and are, on occasions, extremely poor.

Following extensive investigations into the causes of these unsatisfactory results, the inventors have now established that the rate at which $PuO_2$ may be dissolved by the action of divalent silver is markedly retarded in the presence of even small amounts of palladium, which is found to be present in increased quantities in irradiated fuel; this effect is apparent whether the palladium is present in solid form or in solution. They have gone on to show that notable improvements in the rates of dissolution of $PuO_2$—and, therefore, in the overall efficiency of the process—may be achieved by the removal of palladium from the system prior to attempting to dissolve the $PuO_2$.

In addition to this specific problem, the methods of the prior art suffer from additional drawbacks in the light of the present requirements. Thus, in the case of EP-B-767465, the process is directed at the treatment of $PuO_2$ residues, whereas the present inventors were particularly concerned with the processing of spent MOx fuel, which comprises (U, Pu)$O_2$, and it was found that the earlier process did not adapt well to the different requirements. Furthermore, whilst both the prior art methods relate to the treatment of unirradiated nuclear fuel, the problem addressed by the present inventors was the treatment of irradiated fuel. As a consequence of the poor rates of dissolution of $PuO_2$ associated with the methods of the prior art, the commercial viability of these processes is detrimentally affected, and many of the advances provided by the two step technique over its predecessor in economic terms are effectively nullified. Hence, the present inventors sought to devise a process which would overcome the deficiencies shown by the prior art methods; specifically, the method seeks to achieve the removal of palladium from the system prior to attempting to dissolve the actinic oxides.

Thus, according to the present invention there is provided a process for dissolving actinic oxides; the process comprising performing the steps of:
(a) introducing the actinic oxides into a solution of nitric acid;
(b) treating the acidic solution in order to substantially remove palladium; and
(c) treating with divalent silver.

Optionally, the process additionally comprises a second treatment of the acidic solution in order to substantially remove palladium, this treatment being carried out following the treatment with divalent silver, and a second treatment with divalent silver, which follows the aforesaid second treatment to substantially remove palladium.

Thus, in a first embodiment of the invention, the component steps of the process are carried out in the stated order, and a single treatment with divalent silver is employed, whereas a second embodiment of the invention envisages a process wherein a first treatment with divalent silver takes place following the initial treatment of the acid solution to remove palladium and the resulting mixture is then further treated to substantially remove palladium prior to a second treatment with divalent silver.

Generally, the actinic oxides comprise mixtures of $UO_2$ and $PuO_2$, or the mixed oxide (U, Pu)$O_2$ ("MOx"). The oxides may be in the form of a solid or may be supplied as a slurry or suspension in a liquid. Preferably, the actinic oxides are comprised in spent nuclear fuel. As specific examples of MOx fuels suitable for treatment by the process of the present invention could be mentioned spent MOx fuel from thermal reactors having a U:Pu ratio in the region of 95:5, and spent MOx fuel from fast breeder reactors, having a U:Pu ratio in the region of 75:25.

Any of the standard techniques which would be familiar to the skilled person may be used for the removal of palladium from the system. Specific examples would include ion exchange or, preferably, solvent extraction. Efficient removal of palladium may be achieved by extraction with a variety of solvents including, for example, tertiary amines such as trilaurylamine, optionally in combination with mixtures of other solvents such as phosphate esters and liquid hydrocarbons; thus, a mixture of the commercially available tertiary ester Alamine 336 in combination with tributyl phosphate and kerosene has been successfully employed for this purpose. Further examples of suitable solvents include dialkyl sulphides and organic phosphine sulphides and their derivatives, such as alkyl phosphorothioic triamides, $(RNH)_3PS$. An alternative approach to the removal of palladium involves denitration of the system by the addition of formic acid, whereupon palladium precipitates from solution as the metal.

The nitric acid is provided as an aqueous solution, preferably at a concentration of 4M to 12M, most preferably 6M to 8M and the temperature of the solution is preferably maintained in the region of 10-50° C., most preferably 20-40° C., i.e. around the ambient.

The treatment with divalent silver generally comprises an electrolytic dissolution process. Preferably, the process involves the addition of a source of monovalent silver to the system combined with treatment in an electrolyser, divalent silver being electrolytically regenerated during the electrolysis process. Typically, the source of monovalent silver comprises a silver salt such as silver nitrate.

In view of the fact that the divalent silver ion is a highly reactive species, the efficiency of its reaction with $PuO_2$ may be impaired as a consequence of a competing reaction of the ion with water. However, since the activation energy of this competing reaction is very much higher than that of the $PuO_2/Ag(II)$ reaction, then its effect may be minimised by carrying out the treatment with divalent silver at moderate temperatures. Specifically, the optimum rate of dissolution of $PuO_2$ is achieved at temperatures between 5° and 50° C., preferably between 15° and 40° C., most preferably between 20° and 30° C.

The steps of the process may be carried out in either continuous or batchwise fashion, and the mode of operation is usually chosen having regard to the specific requirements of the situation. Thus, in a process according to the first embodiment of the invention, the oxides of uranium and plutonium and the nitric acid are simultaneously introduced into a vessel on a continuous basis to dissolve the oxides of uranium, oxides of plutonium being separated by filtration; the solution is subjected to, for example, a batchwise solvent extraction treatment to effect removal of palladium, silver nitrate is then added to the filtered oxides of plutonium and the resulting slurry is subjected to a continuous electrolysis process in order to effect dissolution of all the actinic oxides.

A corresponding process according to the second embodiment of the invention would envisage filtration to remove undissolved $PuO_2$ following the treatment with divalent silver, the filtered solution being subjected to a further batchwise solvent extraction treatment to effect removal of palladium; thereafter, a second treatment with divalent silver is performed, silver nitrate being added to the plutonium oxides and the resulting slurry being subjected to a continuous electrolysis process in order to effect dissolution of all the actinic oxides.

Any embodiment of the process according to the present invention provides significant improvements in the rate of dissolution of oxides of plutonium when compared with the methods of the prior art, thereby allowing greater recovery of plutonium from the residues and waste streams frequently encountered in the nuclear industry. Consequently, it affords major benefits in terms of efficiency, with the attendant economic and environmental benefits.

Furthermore, the process of the invention facilitates the dissolution, and recovery of plutonium from irradiated MOx fuels which result from MOx fuel reprocessing; no process had previously been available for readily performing these tasks.

The invention claimed is:

1. A process for dissolving actinic oxides, the process comprising performing the steps of:
   introducing the actinic oxides into a solution of nitric acid, wherein the actinic oxides include at least PuO or the mixed oxide $(U, Pu)O_2$;
   treating the acidic solution in order to substantially remove palladium from the acidic solution; and
   treating with divalent silver.

2. The process of claim 1 which additionally comprises performing the steps of:
   further treating the acidic solution in order to substantially remove palladium; and
   further treating with divalent silver.

3. The process of claim 1 wherein the actinic oxides comprise mixtures of $UO_2$ and $PuO_2$ or the mixed oxide $(U, Pu)O_2$.

4. The process of claim 3 wherein the actinic oxide has a U:Pu ratio in the region of 95:5.

5. The process of claim 3 wherein the actinic oxide has a U:Pu ratio in the region of 75:25.

6. The process of claim 1 wherein the actinic oxides are comprised in spent nuclear fuel.

7. The process of claim 1 wherein the actinic oxides are in the form of a solid, a slurry or suspension.

8. The process of claim 1 wherein the treatment to substantially remove palladium comprises treatment by solvent extraction.

9. The process of claim 8 wherein said solvent extraction comprises extraction with triaurylamine, Alamine 336 in combination with tributyl phosphate and kerosene, a dialkyl sulphide or an organic phosphine sulphides or its derivative.

10. The process of claim 1 wherein the treatment to substantially remove palladium comprises ion exchange.

11. The process of claim 1 wherein the treatment to substantially remove palladium comprises denitration of the system by the addition of formic acid to cause palladium to precipitate from solution as the metal.

12. The process of claim 1 wherein the nitric acid is provided as an aqueous solution at a concentration of 4M to 12M.

13. The process of claim 12 wherein the concentration is 6M to 8M.

14. The process of claim 1 wherein the temperature of the nitric acid is maintained in the region of 10-50° C.

15. The process of claim 14 wherein the temperature is maintained in the region of 20-40° C.

16. The process of claim 1 wherein the treatment with divalent silver comprises an electrolytic dissolution process.

17. The process of claim 16 wherein the process comprises the addition of a source of monovalent silver to the system and treatment in an electrolyser to electrolytically regenerate divalent silver.

18. The process of claim 17 wherein the source of monovalent silver is silver nitrate.

19. The process of claim 1 wherein the treatment with divalent silver is carried out at a temperature between 5° and 50° C.

20. The process of claim 19 wherein said temperature is between 15° and 40° C.

21. The process of claim 20 wherein said temperature is between 20° and 30° C.

22. The process of claim 1 wherein the steps of the process are carried out in either a batchwise or a continuous fashion.

* * * * *